(12) United States Patent  (10) Patent No.: US 8,436,261 B2
Coleman  (45) Date of Patent: May 7, 2013

(54) CANTILEVER BEAM SCALE

(76) Inventor: Nate John Coleman, Murrieta, CA (US)

( * ) Notice: Subject to any disclaimer, the term of this patent is extended or adjusted under 35 U.S.C. 154(b) by 0 days.

(21) Appl. No.: 11/010,161

(22) Filed: Dec. 13, 2004

(65) Prior Publication Data

US 2006/0124365 A1    Jun. 15, 2006

(51) Int. Cl.
  *G01G 3/12* (2006.01)
  *G01G 3/13* (2006.01)
  *G01G 19/08* (2006.01)

(52) U.S. Cl.
  USPC ........... 177/136; 177/144; 177/199; 177/200; 177/211; 177/229; 73/862.338; 73/862.639

(58) Field of Classification Search ............ 73/862.634, 73/862.639, 862.338, 862.34; 177/136, 144, 177/199–200, 211, 229
  See application file for complete search history.

(56) References Cited

U.S. PATENT DOCUMENTS

| | | | | |
|---|---|---|---|---|
| 2,597,751 A * | 5/1952 | Ruge | | 338/5 |
| 3,059,710 A * | 10/1962 | Pien | | 177/136 |
| 3,602,866 A * | 8/1971 | Saxl | | 338/5 |
| 3,657,475 A * | 4/1972 | Peronneau et al. | | 178/18.05 |
| 3,724,575 A * | 4/1973 | Kutsay | | 177/211 |
| 3,990,032 A * | 11/1976 | Fish et al. | | 338/5 |
| 4,121,049 A * | 10/1978 | Roeber | | 178/18.01 |
| 4,340,777 A * | 7/1982 | DeCosta et al. | | 178/20.02 |
| 4,421,186 A * | 12/1983 | Bradley | | 177/139 |
| 4,423,640 A * | 1/1984 | Jetter | | 73/862.634 |
| 4,476,946 A * | 10/1984 | Smith | | 177/144 |
| 4,530,245 A * | 7/1985 | Jacobson | | 73/768 |
| 4,688,434 A * | 8/1987 | Cherbuy | | 73/862.622 |
| 4,747,456 A * | 5/1988 | Kitagawa et al. | | 177/211 |
| 4,788,930 A * | 12/1988 | Matteau et al. | | 177/16 |
| 4,951,765 A * | 8/1990 | Naito et al. | | 177/211 |
| 5,209,313 A * | 5/1993 | Brodrick et al. | | 177/139 |
| 5,510,581 A * | 4/1996 | Angel | | 177/211 |
| 5,623,128 A * | 4/1997 | Grimm et al. | | 177/25.13 |
| 5,714,695 A * | 2/1998 | Bruns | | 73/862.641 |
| 5,837,946 A * | 11/1998 | Johnson et al. | | 177/136 |
| 5,959,257 A * | 9/1999 | Campbell et al. | | 177/16 |
| 6,313,414 B1 * | 11/2001 | Campbell | | 177/16 |
| 6,610,935 B1 * | 8/2003 | Siegel | | 177/211 |
| 7,040,455 B2 * | 5/2006 | Bogat | | 186/61 |
| 7,049,529 B2 * | 5/2006 | Vogel et al. | | 177/144 |
| 7,055,365 B2 * | 6/2006 | Yanagi | | 73/1.13 |
| 7,319,198 B2 * | 1/2008 | Kuchel et al. | | 177/211 |
| 2004/0140137 A1 * | 7/2004 | Selig et al. | | 177/144 |
| 2004/0200644 A1 * | 10/2004 | Paine et al. | | 177/136 |

* cited by examiner

*Primary Examiner* — Randy W Gibson

(57) ABSTRACT

An improved device for the measuring of weight or force is disclosed. This is an apparatus that allows for measurement of weight or force using a cantilever beam that is substantially insensitive to location of the weight or force within certain limits on the beam and is capable of correction for off-level conditions.

15 Claims, 2 Drawing Sheets

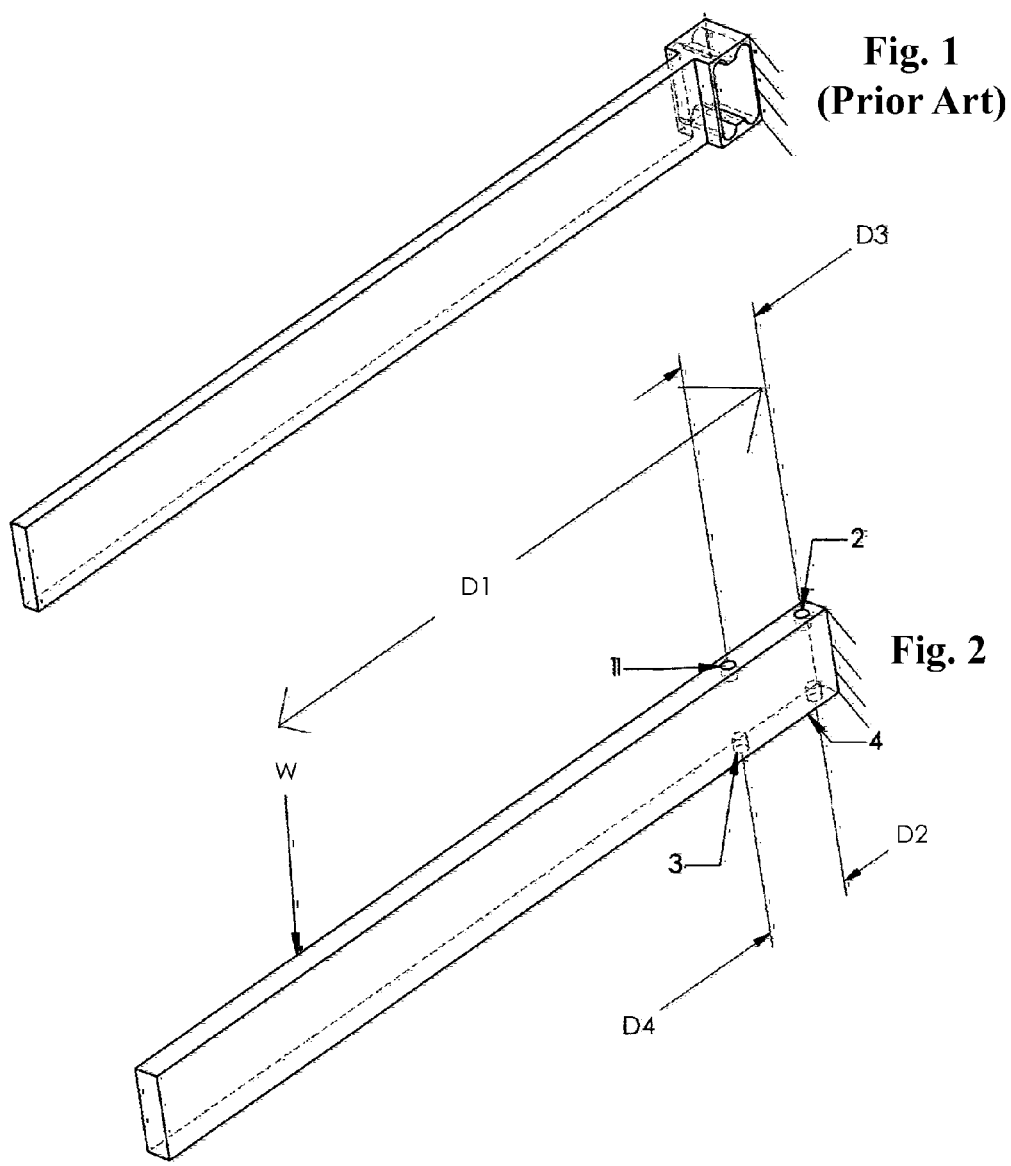

CANTILEVER BEAM SCALE

BACKGROUND OF THE INVENTION

1. Field of the Invention

The invention relates generally to the field of weighing, and specifically to measurement of force or weight in situations where the location of the force or weight is not known and/or cannot be controlled. This is especially relevant to weigh-in-motion or mobile applications such as fork trucks and refuse collection vehicles where the location of the center of the load is unknown and the ground or floor may not be level. In this application, the load is contained in some large bin or atop a pallet, and is acquired by the vehicle via a "fork" comprised of a cantilever beam that is inserted into receptacles in the bin or under the pallet.

2. Description of Related Art

Devices for measuring weight or force are common in everyday life and commerce. Often these devices function by measuring the mechanical strain in a small area of the device with an attached resistor commonly referred to as a "strain gauge" which changes resistance with strain or by balancing against an accurately known reference weight on a lever device. In these devices the location of the weight must be controlled or the effect of the weight on the loading platform must be controlled mechanically. In some devices, where position of the weight cannot be precisely controlled or known, such as scales for use in refuse truck front forks, the designers have opted to use a shear force measuring load cell or to place strain gauges in a location and in geometric features optimized to measure shear force near the root of the cantilever beam which comprises the lifting fork. Theoretically, the shear stresses anywhere in the lifting fork between the proximal end of the beam (the end where the beam is attached to the vehicle) and the load are a function of the applied load and geometry and are independent of the exact location of the loading of the beam. This means is described in patent (Ruge U.S. Pat. No. 2,597,751). In practice this has been difficult and resulted in cantilever beam scales which contain mechanical complications, produce inaccurate results, and are fragile. Further, replacement of the strain gauges or retrofit of a gauged system to a non-weighing one requires removal of the fork. Further, the "shear" type load sensors cannot compensate for off-level loading condition by themselves. The shear sensing beams must also include weakening features such as cutouts (described in Ruge and shown here as typically practiced) due to the fact that the shear forces, while constant over some length of the beam, are small compared to the bending forces. The bending forces in the cantilever beam are generally greater, but vary relative to the position of the weight or load and thus in prior art, cannot be used to measure a weight in devices that cannot control or determine location of the load. What is needed therefore is a means to resolve a weight or force without knowing or controlling it's location in the bin, on the pallet or knowing or controlling the angle of the approach (off-level condition of the ground) using a mechanically simple and robust, easily serviced and retro-fittable device. This device should use the greater bending forces present in the lifting fork instead of the shear forces.

SUMMARY OF THE INVENTION

In light of problems associated with the current art, it is an object of the present invention to provide a mechanically robust, accurate, and inexpensive means to weigh or measure force by detection of bending stresses without regard to location of the load to be measured, and to provide correction for real world difficulties such as off-level weighing.

BRIEF DESCRIPTION OF THE DRAWINGS

The objects and features of the present invention, which are believed to be novel, are set forth with particularity to the appended claims. The present invention, both as to it's organization and manner of operation, together with further objects and advantages, may be best understood by reference to the following description, taken in connection with the accompanying drawings, of which:

FIG. 1 is a view of prior art.

FIG. 2 is a view of a preferred embodiment of the present invention.

DETAILED DESCRIPTION OF THE PREFERRED EMBODIMENTS

Figure 3:
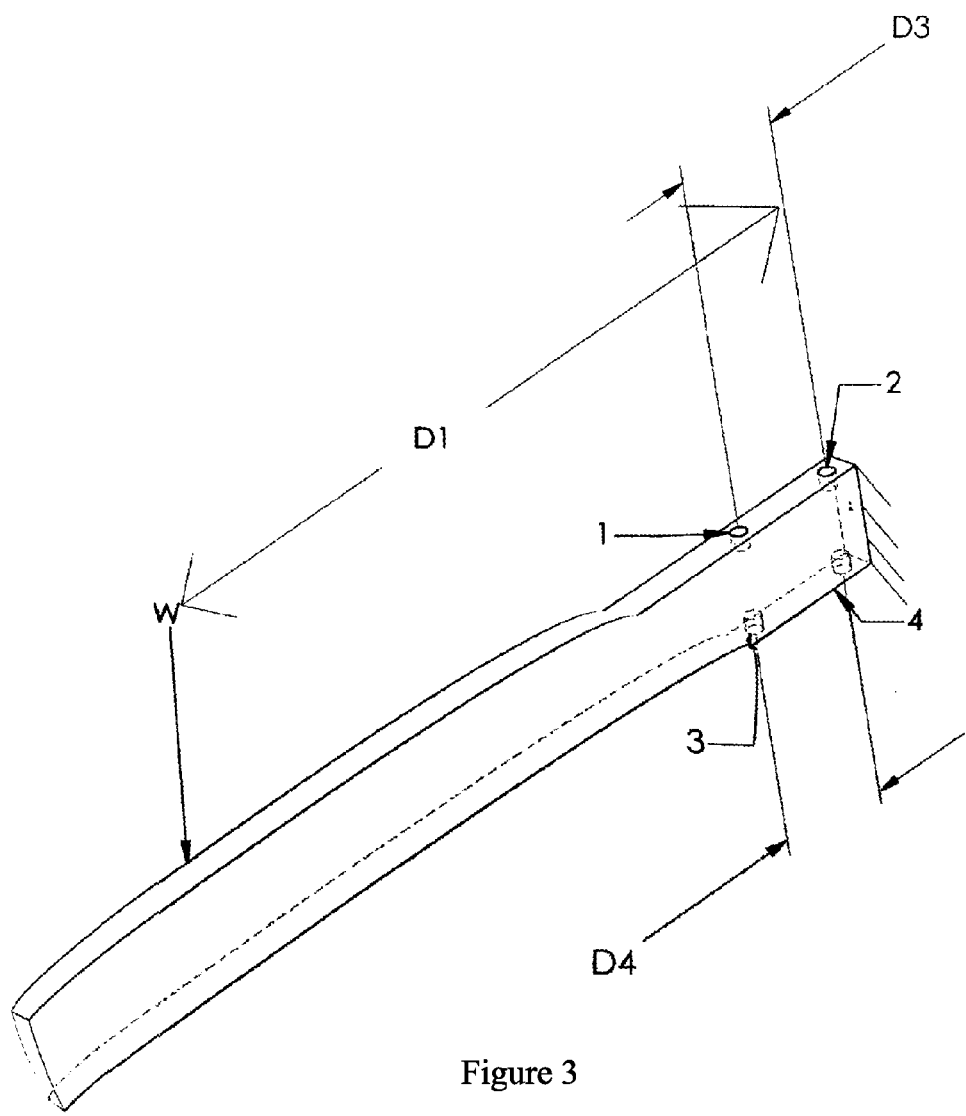
FIG. 3 shows a non-limiting example of a non-straight beam. The present invention need not be limited only to a straight beam.

The following description is provided to enable any person skilled in the art to make and use the invention and sets forth the best modes contemplated by the inventor of carrying out his invention. Various modifications, however will remain readily apparent to those skilled in the art, since generic principles of the present invention have been defined herein specifically to provide an Improved Cantilever Beam Scale.

"Sensor" is not limited to a strain gauge; by non-limiting illustration, "sensor" can be a Wheatstone bridge, a strain gauge, a resistor, or any combination thereof.

Present art, depicted in FIG. 1 shows a beam affixed to a load cell. The load cell of FIG. 1 is designed to change shape as a load "W" is applied to the cantilever beam lifting fork. Due to geometry, the load cell of FIG. 1 by design increasingly changes shape with increasing load from a nominal rectangle into a nominal parallelogram. Because of this, it is intended by design to react to a shear force and thus be affected as little as possible by the location of the load "W" along the length of the beam. Strain gauges can be applied in the high strain areas of the load cell to measure this local strain. This local strain can then be used to calculate the load much as described by Ruge (U.S. Pat. No. 2,597,751). This is the current state of the art as practiced.

The present invention can be best understood by consideration of FIG. 2.

Shown in FIG. 2 is a cantilever beam, fashioned to use bending forces to resolve a weight or load independent of the location of the load, and easily compensated for off-level condition. To describe function, we will first examine the well-known means of analysis of stress in a cantilever beam.

The well known formula for stress in a cantilever beam is given as "MC/I" where "M" is a moment (twisting force) resulting from the amount of load applied and it's "lever arm" or distance from the attachment point of the beam. In our FIG. 2, "M" becomes "WD1, so our stress equation becomes WD1C/I where "W" is some weight to be measured, "I" is the moment of inertia of the beam and C is the distance from the "neutral axis" (a well known concept from Engineering) where there is no compressive or tensile stresses from bending. Obviously, these compressive or tensile stresses are greatest at the top and bottom surfaces of the beam shown, as well as being greatest close to the attachment point of the beam shown here as the cross hatched area to the right of the beam. This would be at or near to where the beam is attached to the vehicle or mobile platform. In the case shown here, "I"

is well known to be (b h^3)/12 for a beam with rectangular cross section as depicted in FIG. 1 and FIG. 2 though it is not intended to limit the device to such rectangular cross sections nor to consistent cross sections as shown here out of simplicity. Note that this beam of FIG. 2 has devices 1, 2, 3, 4 applied to measure local strain of the material. This is a well established practice and involves the use of elements whose properties, usually electrical resistance, change in a predictable manner with strain of the underlying material. These can be applied directly to the beam with an adhesive, mechanical fastener, or the strain gauges might be incorporated into a unit which is pressed into a hole or welded to the structure. These devices can for higher performance, economy, and simplicity be complete implant-able or attachable Wheatstone Bridges so that any correction of the flex element and strain gauge properties may be done on the small implanted element in a volume production manner such as described by Jacobson U.S. Pat. No. 4,530,245, avoiding the in-situ correction described by Cheruby.

The stress at any location in the beam is determined by the load, given in FIG. 2 as "W" and geometry. The tensile stress that would be given by a strain gauge or other sensing device would be (W Dn C)/(I) where:

Dn is the distance along the beam from the load to the point of local strain measurement. In FIG. 2 Dn is denoted as D1 to elements "2" and "4" and D1-D4 to elements "1" and "3" in the simplified case shown where "1" and "3" are co-axial and "2" and "4" are coaxial, ie "D3"="D4".

C is the distance from the neutral axis of the beam to the point of measurement as shown in FIG. 2.

W is the applied force or weight

I is the moment of inertia of the beam, in this case, (b h^3)/12 as described earlier.

Obviously, to obtain the highest sensitivity, these gauges, (or complete insertable Wheatstone Bridge devices) would be located as near to the attachment point of the beam, and as near to the upper and lower surfaces as practical.

From this, it can be shown that each individual strain measuring device will have an output that varies predictably with both W and Dn. The gauge 2 will have an output in tension higher than gauge 1 (i.e.: D1>D1−D3). The gauge 4 will have an output in compression higher than gauge 3 (i.e.: D1>D1−D4). Further, if the beam is level, the output of "1" will be of equal magnitude but opposite in sign (compressive vs. tensile) to "3", and the same for "2" versus "4" for the case where these devices are co-axial as described above. If D4 and D3 are known, it will be possible to resolve an unknown weight at an unknown location on the beam. Further, it will also be possible to correct for off-level condition by using the difference in magnitude of the upper ("1" and "2") versus lower ("3" and "4") sensors. For situations where the beam is pointing upwards such as picking up a load from an uphill approach, the output of the bottom sensors (in compression) will exceed the output of the upper sensors (in tension). The opposite situation would apply for a downhill approach. This "disagreement" can be used by the solution algorithm to correct for and even to determine slope.

Resolution of the weight will start with the realization that local strain measured at 1, 2, 3, and 4 will vary linearly with D1. An increase in D1 results in higher output of any of these sensors. For the purposes of this explanation, we will imagine individual strain sensing elements 1, 2, 3, and 4 at positions 1, 2, 3, and 4 respectively. These can be applied directly to the beam at these locations or may be of a self contained type of local strain sensor with strain gauges arranged in Wheatstone Bridge configuration across an internal membrane. These sensors are in common use typified by products such as the "Gozinta" manufactured by SI Technologies of Tustin, Calif. and as described in Jacobson U.S. Pat. No. 4,530,245 that can be pressed into the holes shown at these locations. In fact, the location of the load on the beam can be determined by knowing the ratio of the outputs of 1:2 and D4 and/or 3:4 and D5. Given this, it can be shown that with a beam material that follows Hooke's Law: (strain sensed by gauge 1)/(strain sensed by gauge 2)=(D1−D3)/D1. Accurately knowing D4 allows us to substitute D3 in the expression with its equivalent (D1−D3) for the shown case where "2" and "4" are coaxial and "1" and "3" are coaxial.

Note that it is correct to express the output of sensor "1", in units of local stress, as:

$$\text{Stress @ } 1 = M1*C/I = W*(D1-D3)*C/I$$

And the output of sensor "2" as:

$$\text{Stress @ } 2 = M2*C/I = W*(D1)C/I = (W*(D1-D3)+W(D3))*C/I$$

Where Mn is the moment resulting from the application of load (n in this case being 1 or 2 for M1 or M2) W and C and I are as described earlier.

For simplicity, the output of the sensors can be said to be calibrated to read in units equal to the local stress in the beam at the location of the sensor. This is not strictly necessary, but if done for this example, it serves the purposes of illustration.

Note here that D3, C, and I are all knowns from the geometry of the cantilever beam. Further, from examination of the expressions for Stress @ 1 and Stress @ 2, it follows that Stress @2=Stress @ 1+(W*D3) C/I. Now all items in the equation are known except W, which can be solved by algebra: W=((Stress @ 2−Stress @ 1)I)/(D3*C)

Here we can define a constant "K" as D4(Cy/I).

The weight applied to the beam can then be described as:

$$F = K(\text{local stress at gauge2})((\text{local stress at gauge1} - \text{local stress at gauge 2})/(\text{local stress at gauge2})).$$

Symmetry will obviously apply to the lower gauges as well though the stresses will be opposite, ie in compression. Further mathematical formulation can be employed to compensate for such real world situations such as bending or curving of the beam and off-level loading.

What is claimed is:

1. An improved mobile or vehicle mounted device for measuring weight or force comprising:
    a cantilever beam secured or affixed at one end to the vehicle or mobile platform, with an array of multiple gauges or sensors placed at known locations on or in said beam substantially near to a secured end, so as to detect a local tensile stress or strain and a local compressive stress or strain in the beam outboard of the sensors; wherein the ratios of outputs from the array of multiple gauges or sensors can be used to determine weight or force applied anywhere along said beam; where the local compressive stress and the local tensile stress are measured substantially simultaneously; where the individual sensors are pressed into a receiver hole formed or cut into the cantilever beam; where the receiver hole is formed around each sensor; and where each receiver hole substantially forms a cylindrical shape around each sensor.

2. The device of claim 1, wherein the multiple gauges or sensors are placed at predetermined locations on the cantilever beam which applies mathematical ratioing formulae to calculate a weight or force using a ratio or subtraction of the outputs from the individual gauges or sensors placed in or on the cantilever beam.

3. The device of claim 1, wherein the multiple gauges or sensors are placed at predetermined locations on the cantilever beam which calculates the ratios of outputs from the individual gauges or sensors.

4. The device of claim 1, wherein the multiple gauges or sensors are placed at predetermined locations on the cantilever beam a difference in output between the tensile and compressive sides of the cantilever beam.

5. The device of claim 1 where the beam is straight or curved or another non-straight beam shape which uses the ratios or subtraction of the outputs of multiple sensors or gauges to resolve a weight or force of unknown location on the beam.

6. The device of claim 1 wherein the individual sensors comprise complete Wheatstone bridges mounted to a plate or membrane which is attached to the cantilever beam.

7. The device of claim 1 where the individual sensors are pressed into a receiver hole formed or cut into the cantilever beam.

8. A scale mounted on a mobile platform comprising:
   (a) a cantilever beam secured or affixed at one end to a mobile platform;
   (b) two gauges or sensors placed at known locations near said secured or affixed end of said cantilever beam, and positioned along the upper portion of said cantilever beam, said sensors being placed either internally to said cantilever beam or externally secured to said cantilever beam, said sensors or gauges being of a type to detect and measure a first local tensile stress and a second tensile stress or strain in said cantilever beam outboard of said sensors or gauges;
   (c) two gauges or sensors placed along the lower portion of cantilever beam, corresponding in location as measured from the end of said cantilever beam to the locations of the sensors placed along the upper portion of said cantilever beam, said sensors likewise being placed either internally to said cantilever beam or externally secured to said cantilever beam, said sensors or gauges likewise being of a type to detect and measure a first local compressive stress and a second compressive stress or strain in said cantilever beam outboard of said sensors and gauges;
   (d) an attachment capable of receiving a force or load to be measured, said attachment located outboard of the location of said gauges or sensors on the opposite end of said cantilever beam than the secured or affixed end;
   (e) the individual output signals of said gauges or sensors and uses a mathematical formulae based on the ratio of the individual output signals to calculate the weight or force applied to said cantilever beam;
   (f) where the local compressive stress and the local tensile stress are measured simultaneously; and
   (g) where the individual sensors are pressed into a receiver hole formed or cut into the cantilever beam.

9. The scale in claim 8 wherein each gauge or sensor further comprises a Wheatstone bridge.

10. The scale in claim 8 wherein said cantilever beam is not straight.

11. A method, comprising: securing a cantilever beam to a vehicle or mobile platform, the cantilever beam having an array of multiple gauges or sensors placed at known locations on or in said beam substantially near to a secured end of the cantilever beam, so as to detect a local tensile stress and a local compressive stress or strain in the beam outboard of the sensors; where the individual sensors are pressed into a receiver hole formed or cut into the cantilever beam.

12. The method of claim 11, further comprising: obtaining a ratio of compressive and tensile outputs from the gauges or sensors to determine weight or force applied anywhere along said beam.

13. The method of claim 11, further comprising: determining weight or force on the beam using a ratio or subtraction of the outputs from the individual gauges or sensors placed in or on the cantilever beam.

14. The method of claim 11, further comprising: mounting an at least one sensor to a plate or membrane which is attached to the beam.

15. The method of claim 11, further comprising:
   (a) pressing an at least one sensor into a receiver hole formed or cut into a cantilever beam;
   (b) where a receiver hole is formed around each Wheatstone bridge;
   (c) where the width of the cantilever beam is not more than the diameter of the at least one sensor; and
   (d) where each receiver hole substantially forms a cylindrical shape around each Wheatstone bridge.

* * * * *